United States Patent [19]
Pasquet et al.

[11] Patent Number: 4,639,430
[45] Date of Patent: Jan. 27, 1987

[54] CATALYST SUPPORT, PROCESS FOR ITS MANUFACTURE, AND CATALYSTS PREPARED WITH THIS SUPPORT

[75] Inventors: Veronique Pasquet, Lyons; Roger Spitz, Serezin, both of France

[73] Assignee: Atochem, France

[21] Appl. No.: 866,139

[22] Filed: May 22, 1986

[30] Foreign Application Priority Data

Jun. 14, 1985 [FR] France ............................... 85 09090

[51] Int. Cl.$^4$ ........................... C08F 4/62; C08F 4/64; C08F 4/68
[52] U.S. Cl. .................................... 502/120; 502/107; 502/117; 502/119; 502/226; 526/125
[58] Field of Search ............... 502/107, 117, 119, 120, 502/226

[56] References Cited

U.S. PATENT DOCUMENTS

| 4,301,029 | 11/1981 | Caunt et al. | 502/119 X |
| 4,350,612 | 9/1982 | Greco et al. | 502/226 |
| 4,467,044 | 8/1984 | Band | 502/120 X |
| 4,565,795 | 1/1986 | Short et al. | 502/119 X |

FOREIGN PATENT DOCUMENTS 1536064 12/1978 United Kingdom ............... 502/119

Primary Examiner—Patrick P. Garvin
Attorney, Agent, or Firm—Sigalos & Levine

[57] ABSTRACT

A catalyst support consisting essentially of a mixture of silica and magnesium chloride, said support having a porous structure and containing less than 100 micromoles of hydroxyl groups per gram of support; the process of making such support by heating such mixture at a temperature below about 720° C. in the presence of a dehydrating agent, and catalysts consisting essentially of such support and at least one active component.

9 Claims, No Drawings

CATALYST SUPPORT, PROCESS FOR ITS MANUFACTURE, AND CATALYSTS PREPARED WITH THIS SUPPORT

BACKGROUND OF THE INVENTION

The present invention pertains to a process for manufacturing a catalyst support based on practically dehydroxylated silica and anhydrous magnesium chloride, the resultant support, and ethylene and alpha-olefin polymerization and copolymerization catalysts based on this support.

It is known that silica can be used as a catalyst support and particularly as a support for the polymerization and copolymerization of alpha-olefins. These catalysts, in general, are constituted of an active product based on magnesium chloride, a halide of a transition metal from Groups IV, V and VI of the Periodic Table of the Elements, preferably titanium, possibly an electron donor and/or an organometallic compound of a metal from Group III of the Periodic Table of the Elements, preferably aluminum.

Before its use as a catalyst support, the silica is usually dehydroxylated by a heat treatment at a high temperature generally above 600° C. In this case the structure of the silica may be transformed and its properties as a catalyst support may become very mediocre. At any rate, there remains a hydroxyl level much higher than 100 micromoles per gram of silica at temperatures at which the porous texture collapses. This is why the hydroxyl groups of the silica are practically preserved for this application. However, these hydroxyl groups may be harmful for the activity of the support-type catalyst. This happens, e.g., in the case of $TiCl_4$, which is susceptible to reaction with the hydroxyl groups of the silica to form $Si-O-TiCl_3$ and $Si-O-TiCl_2$-type bonds, and the activity of the titanium decreases in this form during the polymerization.

SUMMARY OF THE INVENTION

According to the present invention, if the catalyst must contain magnesium chloride, it is possible to obtain a support based on silica and magnesium chloride containing less than 100 micromoles of hydroxyl groups per gram of support while permitting the silica to preserve its properties as a catalyst support. This catalyst support can be characterized by $SiO_2/MgCl_2$ weight ratios ranging from 1 to 20.

The invention also comprises the method of making such support and catalysts comprising such support as set forth below.

DETAILED DESCRIPTION

The manufacturing process comprises associating the magnesium chloride with the silica and treating the mixture at a temperature below about 720° C. in the presence of a dehydrating agent which possesses sufficient volatility not to leave any deposit on the support after the treatment. The particularly recommended dehydrating agents are volatile chlorinated compounds such as hydrochloric acid and salts thereof which are capable of releasing hydrochloric acid upon heating and to be eliminated without leaving any harmful residue for the catalyst support. Ammonium chloride is particularly recommended in this case, contrary to what could be expected according to Peri, J. B., *J. Phys. Chem.* 70, 2937 (1966), who showed the existence of nitrogen-containing residues on the silica during its contact with hydrochloric acid and ammonia.

The magnesium chloride can be associated with the silica by any known means, the simplest being mixing the products in the dry state or impregnating a given quantity of silica in the dispersed state in a (preferably saturated) aqueous solution of magnesium chloride. While being one of the simplest methods, the impregnation method also seems to be the most efficient one for homogeneously distributing the magnesium chloride on the silica.

The dehydrating agent is introduced at any time during the association of the silica with the magnesium chloride. It is practicable to add it to the combination prior to the heat treatment at a temperature below 720° C. The exact quantity of the dehydrating agent is of little significance; it is enough that it be sufficient to eliminate the maximum amount of hydroxyl groups and to avoid an unnecessary excess which offers no advantage whatsoever. About 20 wt.% dehydrating agent relative to the weight of the silica is appropriate.

Finally, a catalyst support is recovered which only has a minimum content of hydroxyl groups thanks to the synergism between the magnesium chloride and the dehydrating agent.

This support is particularly adapted for the polymerization and copolymerization of alpha-olefins, including ethylene.

This catalyst manufacture may be carried out by any known method, generally comprising depositing a minimum amount of an active compound, which is usually selected from among the halides of a transition metal from Groups IV, V and VI of the Periodic Table of the Elements; the compound most commonly used being titanium chloride, on the surface of the support.

It can also be recommended that the active compound on the support be associated with an electron donor selected, for example, aliphatic carboxylic acids, aromatic carboxylic acids, the alkyl esters of aliphatic carboxylic acids, the alkyl esters of aromatic carboxylic acids, aliphatic ethers, cyclic ethers, aliphatic ketones, aromatic ketones, aliphatic aldehydes, aliphatic alcohols, aromatic alcohols, halides of aliphatic acids, aliphatic nitriles, aromatic nitriles, aliphatic amines, aromatic amines, aliphatic phosphines and aromatic phosphines, whether these compounds are monofunctional or polyfunctional.

The electron donor is impregnated on the support during any phase of the manufacture of the catalyst. It may be incorporated in the support by mixing it with the active product, or it may be impregnated on the support before or after the treatment of the support with the active product.

The catalyst thus prepared can be used for any mode of polymerization or copolymerization of ethylene or alpha-olefins, particularly in the suspension polymerization or gas-phase polymerization.

The invention will be further described in connection with the following examples which are set forth for purposes of illustration only.

EXAMPLE 1

1.1. Preparation of the Support 10 g silica (Grace 1952) are impregnated with 4.5 ml saturated $MgCl_2$ solution while stirring. Part of the water introduced into this support is removed under vacuum at a temperature of ca 100° C., after which this support is mixed with 2 g crystalline $NH_4Cl$. The mixture is slowly heated to 550° C. under argon; this temperature is maintained for ca. 30 minutes to achieve the heat treatment of the support.

For comparison, the following materials are subjected to the same heat treatment:
(i) silica alone,
(ii) silica associated only with ammonium chloride under the same conditions as in the experiment, and
(iii) silica associated with magnesium chloride under the same conditions as in the experiment.

The quantities of the hydroxyl groups measured on the four supports are the following:

| SUPPORT | OH groups in micromoles per gram of support | Nitrogen content |
|---|---|---|
| Silica alone | 510 | — |
| Silica + ammonium chloride | 400 | Nondetectable |
| Silica + magnesium chloride | 400 | — |
| Silica + ammonium chloride + magnesium chloride | 78 | Nondetectable |

It is apparent from these experimental results that there is a synergism between the ammonium chloride and the magnesium chloride which facilitates the dehydration of the silica.

1.2. Preparation of the Catalyst 3 to 4 g support, placed into a Schlenck tube, are impregnated with heptane prior to the addition of 2 ml $TiCl_4$. The mixture is agitated under argon at 65° C. for 2.5 hours. The nonbound $TiCl_4$ and the heptane are removed under vacuum of ca. $10^{-5}$ mbar.

1.3. Polymerization Experiments 1.3.1. Polymerization of Ethylene 450 mmoles isoprenyl aluminum (expressed as aluminum) and 18 mg of the above-described catalyst containing 3% Ti are introduced into a 1,500-ml reaction vessel under an argon atmosphere.

The reaction vessel, into which the ethylene and hydrogen are introduced, is heated to 95° C., the partial pressure of the hydrogen being 2 bar. The total pressure is maintained at 16 bar by the continuous supply of ethylene.

After a reaction time of four hours, the reaction vessel is decompressed. 70 g polyethylene are obtained in the form of a dry powder which possesses the following characteristics:
density: 0.963
grade at 5 kg: 0.92
grade at 21.6 kg: 11.18
apparent density (AD): 0.32 g/cm$^3$
productivity relative to the titanium: 130,000 g/g titanium.

1.3.2. Copolymerization of Ethylene and Butene

The reaction vessel is supplied with a mixture of ethylene and butene containing 4.2 mol.% butene under the polymerization conditions of ethylene, the weight of the catalyst only being 23 mg and the hydrogen pressure 1 bar.

After a reaction time of four hours, 280 g linear polyethylene possessing the following characteristics are obtained:
density: 0.919
grade at 2.16 kg: 1.37
grade at 21.6 kg: 44.04
melt flow ratio: 32.15
AD: 0.415 g/cm$^3$
productivity relative to the titanium: 405,800 g/g titanium.

1.3.3. Copolymerization of Ethylene and Butene (Comparison Example)

The catalyst is prepared under the conditions of Example 1.2. from a $SiO_2+MgCl_2$ support heat-treated in the absence of $NH_4Cl$.

The polymerization conditions of ethylene (1.3.1.) are used, the weight of the catalyst containing 3.9% Ti being 20 mg and the hydrogen pressure being 1 bar. The reaction vessel is fed with a mixture of ethylene and butene containing 3.5 mol.% butene.

After a reaction time of four hours, 65 g linear polyethylene possessing the following characteristics are obtained:
density: 0.924
grade at 2.16 kg: 0.76
grade at 21.6 kg: 24.94
melt flow ratio: 32.8
AD: 0.393 g/cm$^3$
productivity relative to titanium: 83,300 g/g titanium.

EXAMPLE 2

2.1. Preparation of the Support

The support is prepared under the conditions of Example 1.1. The quantity of saturated $MgCl_2$ solution was 14 ml. The hydroxyl group content of this support is lower than 5 micromoles per gram.

2.2 Preparation of the Catalyst

The catalyst is prepared under the conditions of Example 1.2.

2.3. Copolymerization of Ethylene and Butene

The conditions are the same as in Example 1.3.2., the weight of the catalyst used, containing 2.55% titanium, is 17 mg, and the hydrogen pressure is 1 bar.

The reaction vessel is fed with a mixture of ethylene and butene containing 4.05 mol.% butene.

After a reaction time of four hours, 120 g linear polyethylene possessing the following characteristics are obtained:
density: 0.919
grade at 2.16 kg: 1.33
grade at 21.6 kg: 37.14
melt flow ration: 28
AD: 0.403 g/cm$^3$
productivity relative to the titanium: 276,000 g/g titanium.

EXAMPLE 3

3.1. Preparation of the Support

The support is prepared under the conditions of Example 2.

3.2. Preparation of the Catalyst

The support is impregnated at 40° C. for one hour with ethyl benzoate diluted with heptane at the ratio of 30% ethyl benzoate relative to the $MgCl_2$. After removal of the excess liquid under vacuum, the support is impregnated with $TiCl_4$ under the same conditions as in Example 1.

3.3 Copolymerization of Ethylene and Butene

The same conditions as in Example 1 are selected; the weight of the catalyst used is 25 mg, and the hydrogen pressure is 1 bar.

The reaction vessel is fed with a mixture of ethylene and butene containing 3.75 mol.% butene.

After a reaction time of four hours, 215 g copolymer possessing the following characteristics are obtained:

density: 0.921
grade at 2.16 kg: 1.63
grade at 21.6 kg: 45.64
melt flow ratio: 28
AD: 0.410 g/cm$^3$
productivity relative to the titanium: 215,000 g/g titanium.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A catalyst support consisting essentially of a mixture of silica and a magnesium chloride, said support having a porous texture and containing less than 100 micromoles of hydroxyl groups per gram of support.

2. The support of claim 1 wherein the SiO$_2$/MgCl$_2$ molar ratio is between about 1 and 20.

3. A process for making the catalyst support of claim 1 or 2 comprising associating magnesium chloride with silica and heating the mixture at a temperature below about 720° C.; in the presence of a dehydrating agent possessing sufficient volatility so as not to leave any deposition in the mixture after heating, for a time sufficient to lower the hydroxyl group of the mixture to less than 100 micromoles per gram of mixture.

4. The process of claim 3 wherein said dehydrating agent is a volatile chlorinated compound.

5. The process of claim 4 wherein said volatile chlorinated compound is hydrochloric acid or a salt thereof capable of releasing hydrochloric acid upon being heated.

6. The process of claim 5 wherein the salt is ammonium chloride.

7. A catalyst for the polymerization of an alphaolefin consisting essentially of a catalyst support of claim 1 or 2 and at least one active component selected from a halide of a transition metal of Group IV, V or VI of the Periodic Table.

8. The catalyst of claim 7 including an electron donor.

9. The catalyst of claim 7 or 8 wherein said active component is titanium chloride.

* * * * *